(12) United States Patent
Jacobson et al.

(10) Patent No.: US 10,508,529 B2
(45) Date of Patent: Dec. 17, 2019

(54) REVERSE EMULSIONS FOR CAVITY CONTROL

(71) Applicant: The Mosaic Company, Plymouth, MN (US)

(72) Inventors: Kathlene Laurie Jacobson, Saskatoon (CA); Cam Thiele, Moose Jaw (CA); Sheldon Rinas, Regina (CA); Carey Heinbigner, Moose Jaw (CA)

(73) Assignee: The Mosaic Company, Plymouth, MN (US)

( * ) Notice: Subject to any disclaimer, the term of this patent is extended or adjusted under 35 U.S.C. 154(b) by 0 days.

(21) Appl. No.: 16/015,372

(22) Filed: Jun. 22, 2018

(65) Prior Publication Data
US 2018/0298742 A1 Oct. 18, 2018

Related U.S. Application Data

(62) Division of application No. 15/158,970, filed on May 19, 2016, now Pat. No. 10,012,066.

(60) Provisional application No. 62/163,486, filed on May 19, 2015.

(51) Int. Cl.
*E21B 43/28* (2006.01)
*C08L 47/00* (2006.01)
*C09K 8/36* (2006.01)

(52) U.S. Cl.
CPC ............ *E21B 43/28* (2013.01); *C08L 47/00* (2013.01); *C09K 8/36* (2013.01); *E21B 43/281* (2013.01)

(58) Field of Classification Search
CPC ......... E21B 43/28; E21B 43/281; C08L 47/00
See application file for complete search history.

(56) References Cited

U.S. PATENT DOCUMENTS

| 3,096,969 A | 7/1963 | Edmonds et al. |
| 3,255,108 A | 6/1966 | Wiese |
| 3,269,946 A | 8/1966 | Wiese |
| 3,433,530 A | 3/1969 | Dahms et al. |

(Continued)

FOREIGN PATENT DOCUMENTS

EP 0111 353 B1 6/1984

OTHER PUBLICATIONS

Search Report and Written Opinion dated Aug. 8, 2016 for PCT Application No. PCT/US2016/033283, 11 pages.

(Continued)

*Primary Examiner* — Carib A Oquendo
(74) *Attorney, Agent, or Firm* — Patterson Thuente Pedersen, P.A.

(57) ABSTRACT

Injection fluids formed of reverse emulsions and related methods of forming and using reverse emulsions for cavity control in solution mining. The reverse emulsion can reduce the volume of oil required to create an oil pad at the roof of a solution mining cavern in order to prevent vertical leaching and cavern collapse. The reverse emulsion can be formed from an emulsifier, a brine solution and oil. The emulsifier concentration can range from about 1% to about 5% by weight of the reverse emulsion. The emulsifier and the oil can be combined to form an oil/emulsifier mixture, wherein the oil/emulsifier mixture is combined with the brine solution to form the reverse emulsion. The oil/emulsifier mixture can be from about 1% to about 5% by weight of the reverse emulsion.

12 Claims, 2 Drawing Sheets

(56) References Cited

U.S. PATENT DOCUMENTS

| | | | |
|---|---|---|---|
| 4,007,964 | A | 2/1977 | Goldsmith |
| 4,249,833 | A | 2/1981 | Talley |
| 4,300,801 | A | 11/1981 | Steenge |
| 4,596,490 | A | 6/1986 | Van Fossan et al. |
| 4,708,753 | A | 11/1987 | Forsberg |
| 4,919,179 | A | 4/1990 | Chattopadhyay |
| 5,057,234 | A | 10/1991 | Bland et al. |
| 5,242,899 | A | 9/1993 | Binon |
| 5,246,273 | A | 9/1993 | Rosar |
| 5,510,044 | A | 4/1996 | Laskowski et al. |
| 5,942,468 | A | 8/1999 | Dobson, Jr. et al. |
| 6,124,245 | A | 9/2000 | Patel |
| 6,861,469 | B2 | 3/2005 | Diener et al. |
| 7,712,533 | B2 | 5/2010 | Qu et al. |
| 7,857,396 | B2 | 12/2010 | Bishop |
| 7,939,659 | B2 | 5/2011 | Daly |
| 8,282,898 | B2 | 10/2012 | Phinney |
| 2003/0060375 | A1* | 3/2003 | Grainger ............... C09K 8/64 507/200 |
| 2005/0084466 | A1* | 4/2005 | Mullay ............... B01F 17/005 424/70.11 |
| 2005/0119405 | A1 | 6/2005 | Ochoa Gomez et al. |
| 2006/0272815 | A1 | 12/2006 | Jones et al. |
| 2012/0316359 | A1 | 12/2012 | Daly |
| 2016/0341023 | A1 | 11/2016 | Jacobson et al. |

OTHER PUBLICATIONS

Application and File history for U.S. Appl. No. 15/158,970, filed May 19, 2016. Inventors: Jacobson et al.

\* cited by examiner

REVERSE EMULSIONS FOR CAVITY CONTROL

RELATED APPLICATIONS

This application is a division of application Ser. No. 15/158,970 filed May 19, 2016, which claims the benefit of U.S. Provisional Application No. 62/163,486 filed May 19, 2015, each of which is hereby incorporated herein in its entirety by reference.

FIELD OF THE INVENTION

Embodiments of the present invention are generally directed to the use of reverse emulsions for cavity control. Specifically, embodiments of the present invention are directed to materials and methods for increasing cavern stability and controlling leaching using reverse emulsions during solution mining.

BACKGROUND OF THE INVENTION

Solution mining, also referred to as in-situ leach mining, is a commonly used method for extracting water-soluble salts such as sylvite (i.e., potash) halite (i.e., sodium chloride), and sodium sulfate. It is also used as a method for producing underground storages cavities for liquid hydrocarbons, compressed natural gas, and waste products. In its most basic form, solution mining requires a cased and cemented borehole, generally comparable to gas or oil wells, which connects a surface plant to the area of water-soluble salt formation (i.e., a salt deposit). Water-based fluids or solvents are injected through the borehole and salt is dissolved from the salt formation to form brine. The brine is then brought back up to the surface for processing. Solution mining is often used in situations where the deposits are too deep or too thin for conventional mining techniques, and solution mining generally creates minimal surface disturbance and little waste compared to conventional mining. Other advantages of solution mining include the fact that impurities in the mined salt can be readily removed from the brine, which allows for production of high-grade salt for other uses, including food, chemical, and pharmaceutical manufacturing. Additionally, any impurities (i.e., insolubles) are readily disposed of by reinjecting them into the cavern. Furthermore, brine is easily transportable and is often times the required form of raw material in some chemical manufacturing processes.

Effective solution mining requires the creation and maintenance of a stable cavern that will remain intact over the course of the leaching period, typically 2-5 years. During the leaching period, the shape of the cavern can be influenced by several parameters, such as the leaching rate, the amount of water or solvent injected, the depths of the leaching equipment, and the duration of the leaching intervals. Often times the roof or upper portion of the cavern is protected by a pad of crude oil. This oil pad is applied to ensure that leaching with, for example, injected water, occurs horizontally only, rather than vertically into the cavern roof. If water is allowed to leach vertically, high concentrations of salt will not be achieved, and the cavern roof would be more likely to collapse.

The use of a pad of oil to mitigate the risks associated with the creation and maintenance of cavity control is quite expensive. One way to reduce this expense would be to reduce the amount of oil required for effective cavity control. For example, one such method could involve the use of emulsions, in particular, reverse emulsions. Emulsions are mixtures of two or more liquids in which particles or droplets of a nonpolar liquid (e.g., oil) are dispersed in a polar medium (e.g., water). Reverse emulsions are typically mixtures of droplets of a polar liquid in a nonpolar medium. The stability of an emulsion or a reverse emulsion depends on the liquids used to create it. Emulsion stability refers to the ability of an emulsion to resist change in its properties and internal-phase bubble size over time. In order to counteract the tendency of emulsions and reverse emulsions to become destabilized, an appropriate surface active agent (i.e., surfactant) or emulsifier, can be used. Generally, surfactants or emulsifiers increase the kinetic stability of an emulsion so that the size of the droplets does not change significantly over time.

Given the widespread use of solution mining, there remains a need to develop efficient and economical materials and methods to maintain cavity control during the leaching process, which can last as long as five years. More specifically, there remains a need to develop materials and methods to reduce the volume of oil required to create the oil pad at the roof of the cavern in order to prevent vertical leaching and cavern collapse.

SUMMARY OF THE INVENTION

Embodiments of the present invention are generally directed to the use of reverse emulsions for cavity control. Specifically, the present invention is directed to materials and methods for increasing cavern stability and controlling leaching using reverse emulsions during solution mining.

In some embodiments, the present invention relates to a process for solution mining using a reverse emulsion comprising oil, brine, and emulsifiers, wherein the reverse emulsion occupies the upper portion or roof of a cavern. The oil of the reverse emulsion can comprise an unprocessed or unused and/or reprocessed crude oil or fractions thereof including, but not limited to, heavy crude oil fractions such as heavy distillates, light crude oil, or combinations thereof. The brine of the reverse emulsion can comprise, for example, about 25% and about 100% saturation of salts, and more particularly between about 25% and about 75% saturation of salts, The salts can comprise, for example, potassium chloride (KCl), sodium chloride (NaCl), and/or calcium chloride ($CaCl_2$). The total brine including salts, insolubles such as clays, and water, make up a final concentration of between about 30% to about 80% of the reverse emulsion. The emulsifier of the reverse emulsion can comprise polyisobutylene succinic anhydride (PIBSA) at a final concentration of about 1 to about 5 weight percent (wt %) of the reverse emulsion. In some embodiments, use of a reverse emulsion in the above composition ranges can reduce the amount of oil typically used in solution mining between about 30% to about 80%.

In embodiments, the present invention relates to a method for creating a reverse emulsion comprising oil, brine, and emulsifiers for use in a solution mining process, wherein the reverse emulsion occupies the upper portion or roof of a cavern. The reverse emulsion can be created by adding an emulsifier or a surfactant to a source of oil, such as, for example, an unprocessed or unused and/or reprocessed oil. Examples of unprocessed oil can comprise refined crude oil or fractions thereof including, but not limited to, heavy crude oil fractions such as heavy distillates, light crude oil, or combinations thereof. Examples of reprocessed oil can comprise reprocessed crank case oil and/or other types of motor and engine oil, recovered heavy distillates, and the like.

In an embodiment, the final concentration of the emulsifier is between about 1 wt % and about 5 wt %.

The oil and emulsifier mixture can then be combined with brine using high energy mixing, such that the mixing creates small particles or droplets of brine (e.g. 0.5-2 µm or smaller in size) that are suspended in the oil and stabilized by the emulsifier. In some cases, the brine of the reverse emulsion can comprise, for example, about 25% and about 100% saturation of salts, and more particularly between about 25% and about 75% saturation of salts, such as, for example, potassium chloride (KCl), sodium chloride (NaCl), and/or calcium chloride ($CaCl_2$). The brine can further include insolubles such as clays, and water, the brine being at a final concentration of between about 30% to about 80% of the reverse emulsion. The oil of the reverse emulsion can comprise an unprocessed or unused and/or reprocessed crude oil as described above. In other cases, the emulsifier of the reverse emulsion can comprise polyisobutylene succinic anhydride (PIMA) at a final concentration of about 1 wt % to about 5 wt % of the reverse emulsion. In some embodiments, the use of an emulsifier in the above composition range can produce a stable reverse emulsion such that the brine particles stay in suspension for longer than five years.

In other embodiments, the present invention relates to a process for solution mining using a reverse emulsion comprising oil, brine, and emulsifiers, wherein the reverse emulsion is injected into a cavern such that the reverse emulsion occupies the upper portion or roof of the cavern, thereby increasing cavern stability and preventing or reducing vertical leaching. The oil of the reverse emulsion can comprise an unprocessed or unused and/or reprocessed crude oil or fractions thereof as described above. In some embodiments, the brine of the reverse emulsion can comprise a solution of potassium chloride (KCl), sodium chloride (NaCl), and/or calcium chloride ($CaCl_2$), insolubles such as clays, and water, such that the brine has a final concentration of between about 30% to about 80% of the reverse emulsion. The brine can comprise, for example, about 25% and about 100% saturation, more particularly between about 25% and about 75% saturation. In one particular non-limiting embodiment, the reverse emulsion can comprise brine comprising a salt solution at about 70% saturation.

In some embodiments, the emulsifier of the reverse emulsion can comprise polyisobutylene succinic anhydride (PIMA) at a final concentration of about 1 wt % to about 5 wt % of the reverse emulsion. In some embodiments, a reverse emulsion in the above composition ranges can be injected into a cavern at a temperature ranging from about 120 F to about 200 F, and more particularly, from about 130 F to about 150 F.

The solution mining materials and methods described above are not limited to the mining of salt. The materials and methods according to embodiments can be used with any types of solution mining processes and systems. The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE FIGURES

Subject matter hereof may be more completely understood in consideration of the following detailed description of various embodiments of the subject matter in connection with the accompanying drawings, in which.

DETAILED DESCRIPTION OF THE DRAWINGS

Figure 1:
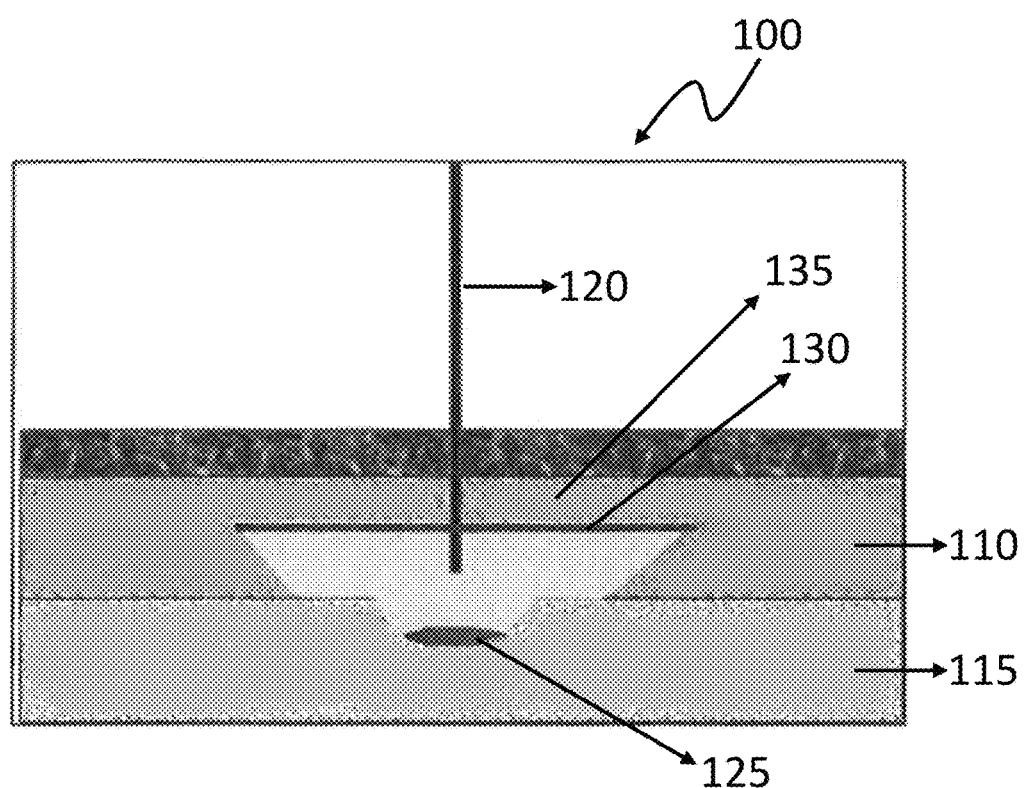
FIG. 1 is a diagram of a solution mining cavern, according to an embodiment of the invention.

As shown in FIG. 1, a non-limiting exemplary embodiment of a system and method for a solution mining process (also referred to as in-situ leach mining), reverse emulsions comprising oil, brine, and emulsifiers can be used to increase cavern stability and to control leaching during the solution mining process. In this non-limiting embodiment, solution mining cavern 100 generally comprises a layer of high grade material to be mined, for example, high grade potash 110, that lies above salt bed 115. During the solution mining process, borehole 120 is used as a means for injecting fluid into the cavern, and for extracting the resulting brine. This extraction process is also referred to as leaching. Typically, brine is a highly concentrated solution of water and salt (e.g., in potash mining, brine is specifically a solution of water and potassium chloride). Brine can be created when potash is extracted during solution mining. Aqueous solutions and other solvents can be injected through borehole 120, dissolving various salts from the salt formation to form brine. The brine can then be brought back up to the surface for processing, while any insoluble impurities 125 settle over time at the bottom (sump) of the cavern. In some cases, separate boreholes can be used for injection and extraction purposes, depending on the material being mined and the composition of the mine. Generally, borehole 120 is cased and cemented and connected to a surface plant where the extracted brine can be processed. Solution mining is often used in situations where the deposits are too deep or too thin for conventional mining techniques, and solution mining generally creates minimal surface disturbance and little waste compared to conventional mining.

In some embodiments, the creation and maintenance of solution mining cavern 100 can involve the use of oil pad 130 on upper portion or roof 135 of cavern 100. Generally, oil pad 130 prevents vertical leaching of the injected fluid during the leaching period, which can last over 5 years. The presence of oil pad 130 in a solution mine can ensure that leaching with, for example, injected hot water, occurs horizontally only within the layer of high grade potash 110, rather than vertically into cavern roof 135. If water is allowed to leach vertically, high concentrations of salt will not be achieved, and cavern roof 135 may be more likely to collapse.

The use of oil pad 130 for solution mining, although effective at increasing cavern stability and controlling leaching, can be very expensive due to the oil cost itself. It would therefore be beneficial and more economical to reduce the amount of oil required to create an oil pad for solution mining. In an embodiment of the present invention, solution mining can involve the use of reverse emulsions comprising oil, brine, and emulsifiers for purposes of oil volume extension in an effort to reduce the volume of oil required without sacrificing effectiveness. Emulsions are mixtures of two or more liquids in which particles or droplets of a nonpolar liquid (e.g., oil) are dispersed in a polar medium (e.g., water). Reverse emulsions are typically mixtures of droplets of a polar liquid in a nonpolar medium. The stability of an emulsion or a reverse emulsion depends on the liquids used to create it. In some cases, a reverse emulsion comprising oil, brine, and emulsifiers can be injected into a solution mine cavern such that it occupies the upper portion or roof of the cavern.

The reverse emulsion can comprise oil from any suitable source, such as, for example, an unprocessed or unused and/or reprocessed oil. Examples of unprocessed oil can comprise refined crude oil or fractions thereof including, but not limited to, heavy crude oil fractions such as heavy distillates, light crude oil, or combinations thereof. Examples of reprocessed oil can comprise reprocessed crank case oil and/or other types of motor and engine oil, recovered heavy distillates, and the like.

The reverse emulsion can also comprise brine having various concentrations of salt up to the point of saturation (i.e., percent saturation). For example, the reverse emulsion can comprise brine comprising salts between about 25% and about 100% saturation. In some cases, the reverse emulsion can comprise brine comprising salts between about 25% and about 75% saturation. In other cases, the reverse emulsion can comprise brine comprising salts at about 70% saturation. The reverse emulsion can also comprise brine comprising various soluble and insoluble salts. For example, the reverse emulsion can comprise brine including potassium chloride (KCl), sodium chloride (NaCl), and/or calcium chloride ($CaCl_2$), insoluble salts such as calcium sulfate (CaSO4)/anhydrite, magnesium chloride ($MgCl_2$), dolomite, magnesium sulfate, silica, quartz, illite, sepchlorite, kaolinite, calcite phosphates, or any other insoluble salts associated with any evaporative member or formation, or any combination thereof.

In some cases, the reverse emulsion can comprise brine formed of a solution of calcium chloride ($CaCl_2$), potassium chloride (KCl), sodium chloride (NaCl), or combinations thereof such that the solution of soluble salts is between about 50% and about 75% saturated. In other cases, the reverse emulsion can comprise brine comprising a solution of potassium chloride and sodium chloride such that the solution of soluble salts is less than about 70% saturated. Regardless of the composition of the brine, embodiments of the reverse emulsion can comprise brine at a final concentration of between about 30% and about 80% of the reverse emulsion. In some cases, the reverse emulsion can comprise brine at a final concentration of between about 50% and about 70% of the reverse emulsion.

The reverse emulsion can also comprise an emulsifier (also referred to as a surfactant) from any suitable source, such that the presence of the emulsifier counteracts the tendency of the reverse emulsions to become destabilized. Generally, surfactants or emulsifiers increase the kinetic stability of an emulsion so that the size of the droplets (e.g. 0.5-2 µm) does not change significantly over time. In some cases, the reverse emulsion can comprise an emulsifier comprising polyisobutylene succinic anhydride (PIBSA) as commercially available from suppliers such as, for example, Lubrizol. Conventionally, PIBSA has found commercial success to form reverse emulsions in the explosives industry. Non-limiting examples of other suitable emulsifiers can include oleic acid, phosphoric acid esters, fatty acid esters, fatty acid ethoxylates, sorbitan ester, sorbitan oleate, other fatty-acid based emulsifiers, and combinations thereof.

In some cases, the reverse emulsion can comprise an emulsifier at a final concentration of about 1 to about 5 weight percent (wt %) of the reverse emulsion. In other cases, the reverse emulsion can comprise an emulsifier at a final concentration of about 1.5 wt % to about 4 wt % of the reverse emulsion. In still other cases, the reverse emulsion can comprise an emulsifier at a final concentration of about 3 wt % of the reverse emulsion. Using reverse emulsions of the present invention, a ratio of oil savings to emulsifier expense can range from 2-10 depending on oil cost, emulsifier cost, emulsifier concentration in reverse emulsion, and percent brine in the reverse emulsion.

Figure 2:
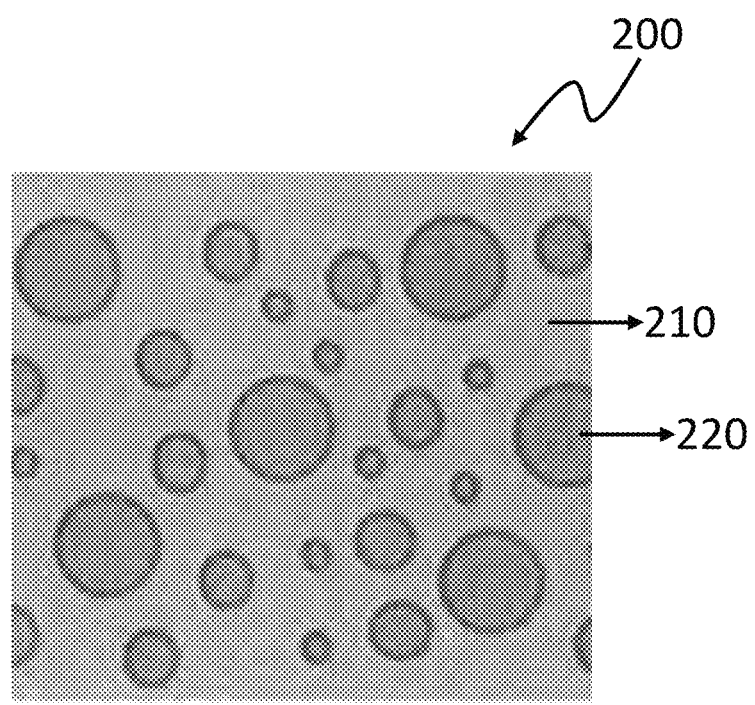
FIG. 2 is a diagram of a reverse emulsion composition, according to an embodiment of the invention.

In some embodiments, the present invention relates to a method for creating a reverse emulsion comprising oil, brine, and emulsifiers for use in a solution mining process, wherein the reverse emulsion occupies the upper portion or roof of a cavern. In some cases, as shown in FIG. 2, reverse emulsion 200 can be created by first adding one or more emulsifier or a surfactant to a source of oil, to produce oil and emulsifier mixture 210. The emulsifier can be added either to oil inline while blending in an emulsion blender, or can be pre-mixed before the emulsion blender. In some cases, the final concentration of the emulsifier is between about 1 wt % and about 5 wt % of the reverse emulsion. In other cases, oil and emulsifier mixture 210 can comprise an emulsifier such that the emulsifier is at a final concentration of about 1.5 wt % to about 4 wt % of the reverse emulsion. In still other cases, oil and emulsifier mixture 210 can comprise an emulsifier such that the emulsifier is at a final concentration of about 3 wt % of the reverse emulsion. In some cases, oil and emulsifier mixture 210 can comprise an emulsifier comprising polyisobutylene succinic anhydride (PIMA). In other case, suitable emulsifiers can include oleic acid, phosphoric acid esters, fatty acid esters, fatty acid ethoxylates, sorbitan ester, sorbitan oleate, other fatty-acid based emulsifiers, and combinations thereof.

In some embodiments of the method of the present invention, as shown in FIG. 2, oil and emulsifier mixture 210 can then be combined with brine using high energy mixing via an emulsion blender, such that the mixing creates small particles or droplets (e.g. 0.5-2 µm) of brine 220 that are suspended in the oil and stabilized by the emulsifier. The reverse emulsion can also comprise brine having various concentrations of salt up to the point of saturation (i.e., percent saturation). For example, the reverse emulsion can comprise brine comprising salts between about 25% and about 100% saturation. In some cases, the reverse emulsion can comprise brine comprising salts between about 25% and about 75% saturation. In other cases, the reverse emulsion can comprise brine comprising salts at about 75% saturation. The reverse emulsion can also comprise brine comprising various salts. For example, the reverse emulsion can comprise brine comprising potassium chloride (KCl), sodium chloride (NaCl), calcium chloride ($CaCl_2$), phosphates, or any combinations thereof. In some cases, the reverse emulsion can comprise brine comprising a solution of potassium chloride (KCl), sodium chloride (NaCl), and/or calcium chloride ($CaCl_2$), such that the solution of soluble salts between about 50% and about 75% saturated. In other cases, the reverse emulsion can comprise brine comprising a solution of potassium chloride and sodium chloride such that the solution of soluble salts is less than about 70% saturated. Regardless of the composition of the brine, embodiments of the reverse emulsion can comprise small particles or droplets of brine 220 at a final concentration of between about 25% and about 75% of the reverse emulsion. In some cases, the reverse emulsion can comprise small particles or droplets of brine 220 at a final concentration of between about 50% and about 75% of the reverse emulsion. In other cases, the reverse emulsion can comprise small particles or droplets of brine 220 at a final concentration of between about 30% and about 80% of the reverse emulsion.

In some embodiments, the present invention relates to a process for solution mining using a reverse emulsion comprising oil, brine, and emulsifiers, wherein the reverse emulsion is injected into a cavern such that the reverse emulsion occupies the upper portion or roof of the cavern, thereby increasing cavern stability and preventing vertical leaching. In some embodiments, a reverse emulsion can be injected into a cavern at a temperature ranging from about 120 F to about 200 F, and more particularly, from about 100 F to about 145 F. In some cases, a process for solution mining comprises using a reverse emulsion created by first adding an emulsifier or a surfactant to a source of oil, including unprocessed or unused and/or reprocessed crude oil or fractions thereof including, but not limited to, heavy crude oil fractions such as heavy distillates, light crude oil, or combinations thereof, such that the final concentration of the emulsifier is between about 1 wt % and about 5 wt % of the reverse emulsion. In other cases, the oil and emulsifier mixture can comprise an emulsifier such that the final concentration of the emulsifier is about 1.5 wt % to about 4 wt % of the reverse emulsion. In still other cases, the oil and emulsifier mixture can comprise an emulsifier such that the final concentration of the emulsifier is about 3 wt % of the reverse emulsion. In some cases, the oil and emulsifier mixture can comprise an emulsifier comprising polyisobutylene succinic anhydride (PIBSA). In other cases, suitable emulsifiers can include oleic acid, phosphoric acid esters, fatty acid esters, fatty acid ethoxylates, sorbitan ester, sorbitan oleate, other fatty-acid based emulsifiers, and combinations thereof.

In some embodiments of the solution mining process of the present invention, the oil and emulsifier mixture can then be combined with brine using high energy mixing, such that the mixing creates small particles or droplets of brine (e.g. 0.5-2 µm) that are suspended in the oil and stabilized by the emulsifier. The reverse emulsion can also comprise brine having various concentrations of salt up to the point of saturation (i.e., percent saturation). For example, the reverse emulsion can comprise brine comprising salts between about 25% and about 100% saturation. In some cases, the reverse emulsion can comprise brine comprising salts between about 25% and about 75% saturation. In other cases, the reverse emulsion can comprise brine comprising salts at about 70% saturation. The reverse emulsion can also comprise brine comprising various salts. For example, the reverse emulsion can comprise brine comprising potassium chloride (KCl), sodium chloride (NaCl), and/or calcium chloride (CaCl$_2$), insolubles such as clays, and water, phosphates, or any combinations thereof. In some cases, the brine is about 50% and about 75% saturated. In other cases, the brine is less than about 70% saturated. Regardless of the composition of the brine, embodiments of the reverse emulsion can comprise brine at a final concentration of between about 25% and about 75% of the reverse emulsion. In some cases, the reverse emulsion can comprise brine at a final concentration of between about 50% and about 75% of the reverse emulsion. In other cases, the reverse emulsion can comprise brine at a final concentration of between about 30% and about 80% of the reverse emulsion.

In general, embodiments of the methods for creating a reverse emulsion for solution mining having the compositions and concentrations above can reduce the amount of oil typically required to form an oil pad by about 30% to about 80%, or can provide added oil pad thickness at equivalent cost. In some embodiments of these methods, an emulsifier having the compositions and concentrations above can be used to produce a stable reverse emulsion such that brine particles stay in suspension for five years or longer in an oil pad in a solution mining cavern.

It should also be appreciated that the exemplary embodiment or exemplary embodiments are only examples, and are not intended to limit the scope, applicability, or composition of the invention in any way. Rather, the foregoing detailed description will provide those skilled in the art with an enabling disclosure for implementing the exemplary embodiment or exemplary embodiments. It should be understood that various changes can be made in the function and arrangement of elements without departing from the scope of the subject matter hereof as set forth in the appended claims and the legal equivalents thereof.

The embodiments above are intended to be illustrative and not limiting. Additional embodiments are within the claims. Although subject matter hereof has been described with reference to particular embodiments, workers skilled in the art will recognize that changes may be made in form and detail without departing from the spirit and scope of the subject matter.

Various modifications to subject matter hereof may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the subject matter. Likewise, the various features described above should all be regarded as example embodiments, rather than limitations to the scope or spirit of the subject matter. Therefore, the above is not contemplated to limit the scope of the subject matter.

For purposes of interpreting the claims for subject matter hereof, it is expressly intended that the provisions of Section 112, sixth paragraph of 35 U.S.C. are not to be invoked unless the specific terms "means for" or "step for" are recited in a claim.

The invention claimed is:

1. An injection fluid for forming an oil pad that occupies a cavern roof in solution mining, comprising:
   a reverse emulsion comprising consisting essentially of an emulsifier, a brine solution, and oil, wherein the injection fluid is configured to form an oil pad that occupies a cavern roof in solution mining.

2. The injection fluid of claim 1, wherein an emulsifier concentration in the reverse emulsion is from about 1% to about 5% by weight of the reverse emulsion.

3. The injection fluid of claim 1, wherein the emulsifier comprises polyisobutylene succinct anhydride (PIBSA).

4. The injection fluid of claim 1, wherein a brine solution concentration in the reverse emulsion is from about 30% to about 80% by weight of the reverse emulsion.

5. The injection fluid of claim 1, wherein the brine solution comprises a solution of water and at least one salt selected from the group consisting of potassium chloride, sodium chloride, and calcium chloride, wherein the salt is present in an amount from about 25% to about 100% of saturation.

6. The injection fluid of claim 1, wherein the reverse emulsion is injected into a solution mining cavern at a temperature from about 120° F. to about 200° F.

7. The injection fluid of claim 1, wherein the emulsifier and the oil are combined to form an oil/emulsifier mixture, and wherein the oil/emulsifier mixture is combined with the brine solution to form the reverse emulsion.

8. The injection fluid of claim 7, wherein the oil/emulsifier mixture comprises from about 1% to about 5% by weight of the reverse emulsion.

9. The injection fluid of claim 1, wherein the oil comprises at least one of unprocessed, unused, and reprocessed crude oil or fractions thereof.

10. The injection fluid of claim 9, wherein the oil comprises heavy crude oil fractions, light crude oil, or both.

11. The injection fluid of claim 1, wherein the reverse emulsion includes small particles or droplets of brine suspended in the oil, the small particles or droplets of brine having a particle size of from about 0.5 to about 2 µm.

12. The injection fluid of claim 1, wherein the reverse emulsion has a shelf stability of at least 5 years.

* * * * *

UNITED STATES PATENT AND TRADEMARK OFFICE
CERTIFICATE OF CORRECTION

PATENT NO. : 10,508,529 B2
APPLICATION NO. : 16/015372
DATED : December 17, 2019
INVENTOR(S) : Kathlene Laurie Jacobson et al.

It is certified that error appears in the above-identified patent and that said Letters Patent is hereby corrected as shown below:

In the Specification

In Column 3, Line 23, delete "PIMA" and insert -- PIBSA --, therefor.

In Column 3, Line 50, delete "PIMA" and insert -- PIBSA --, therefor.

In Column 6, Line 30, delete "PIMA" and insert -- PIBSA --, therefor.

Signed and Sealed this
Twenty-sixth Day of May, 2020

Andrei Iancu
*Director of the United States Patent and Trademark Office*